(12) United States Patent
Farnung et al.

(10) Patent No.: US 6,538,661 B1
(45) Date of Patent: Mar. 25, 2003

(54) APPARATUS AND METHODS OF CONTROLLING IMAGE FORMING APPARATUS

(75) Inventors: Charles Edmund Farnung, Rochester, NY (US); Ramesh Nagarajan, Fairport, NY (US); Francis Tse, Rochester, NY (US); Julie Ann Fisher, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/512,769

(22) Filed: Feb. 25, 2000

(51) Int. Cl.[7] .................................................. G06F 3/00
(52) U.S. Cl. ....................................................... 345/594
(58) Field of Search .......................... 345/89, 589, 592, 345/593, 594, 596, 597, 601, 607

(56) References Cited

U.S. PATENT DOCUMENTS 5,898,821 A * 4/1999 Brandkamp .................. 395/109

* cited by examiner

Primary Examiner—Matthew C. Bella
Assistant Examiner—G. F. Cunningham
(74) Attorney, Agent, or Firm—Oliff & Berridge, PLC

(57) ABSTRACT

A method of controlling an image forming apparatus in accordance with the invention can include the steps of: providing a system tone reproduction curve; representing a manually adjustable tone reproduction curve; modifying the manually adjustable tone reproduction curve to be consistent with the system tone reproduction curve; and cascading the manually adjustable tone reproduction curve with the system tone reproduction curve to provide a new adjusted tone reproduction curve. The method in accordance with the invention enables a user to achieve enhanced flexibility in determining how to adjust an output image. The method can also determine a new system tone reproduction curve, based upon the current settings of the manually adjustable tone reproduction curve, in real time, which reduces the amount of storage space required.

17 Claims, 7 Drawing Sheets

| L* in 5 bar | L* out 5 bar |
|---|---|
| 0 | 0 |
| 10 | 0 |
| 30 | 20 |
| 50 | 40 |
| 70 | 60 |
| 90 | 80 |
| 100 | 80 |

| L* in sys | L* out sys |
|---|---|
| 0 | 22 |
| 20 | 22 |
| 30 | 33 |
| 43 | 51 |
| 48 | 59 |
| 65 | 81 |
| 72 | 86 |
| 94 | 94 |
| 100 | 94 |

| L* in sys new | L* out sys new |
|---|---|
| 0 | 22 |
| 30 | 22 |
| 40 | 33 |
| 53 | 51 |
| 58 | 59 |
| 75 | 81 |
| 82 | 86 |
| 100 | 94 |

APPARATUS AND METHODS OF CONTROLLING IMAGE FORMING APPARATUS

The entire disclosure of application Ser. Nos. 09/512,888, 09/512,887, and 09/512,889, filed herewith, is hereby incorporated by reference.

BACKGROUND OF THE INVENTION

1. Field of Invention

This invention is directed to apparatus and methods of controlling image forming apparatus, and in particular to the use of tone reproduction curves (TRC) in the control of image forming apparatus.

2. Description of Related Art

A typical image forming apparatus includes an input device, such as, for example, a scanner. The input device inputs image information relating to an original image into the apparatus. The typical image forming apparatus also includes an output device that forms an image based on the input image information. The output device can form an image in any medium, such as, for example, a printer that prints an image on a recording medium, or a monitor that displays an image on a screen.

However, discrepancies typically exist between the image information input by the input device and the image formed by the output device. These discrepancies can take the form of differences in contrast and brightness between the input image information and the output image. Such differences ultimately prevent the output image from being a true and accurate representation of the original image.

SUMMARY OF THE INVENTION

Tone reproduction curves (TRC) can be used to compensate for the differences in brightness and contrast between the input image information and output image. For example, each type of input device and output device can define a certain and unique curve based upon brightness versus contrast. Differences between these curves cause the output image to vary from the original image, as discussed above. However, a TRC can be used to compensate for the differences so as to bring the curves together and thereby enable the output image to more closely resemble the original image.

It is therefore desirable to provide an image forming apparatus with a system TRC. The system TRC can be calculated once the characteristics of the input and output devices are known, such as the devices' unique brightness versus contrast curves. In operation, the image forming apparatus can augment the input image information via the calculated system TRC so that the output device is able to provide an output image that closely matches the original image in terms of brightness and contrast.

It is also desirable to enable a user to set the TRC to suit the user's particular needs. For example, the TRC can be represented to the user as five bars, which the user can set to provide a customized system TRC and thereby achieve a desired response. Thus, the user can be provided with the flexibility to choose an exact input/output relationship for the document being processed. The five settings provided on sliders can be used to calculate the system TRC using linear interpolation of the points, and the resultant image processing TRC can be computed by any method, such as the Jones plotting method.

Exemplary apparatus and methods for providing the user with the flexibility discussed above via graphical user interfaces and image capturing devices are disclosed in co-pending U.S. patent application Ser. No. 09/487,271, filed Jan. 19, 2000, entitled SYSTEMS, METHODS AND GRAPHICAL USER INTERFACES FOR CONTROLLING TONE REPRODUCTION CURVES OF IMAGE CAPTURE AND FORMING DEVICES, the entire content of which is hereby incorporated into this application by reference.

It is further desirable to combine these operations so as to adjust a current system TRC with a manually adjustable five bar TRC. All permutations of settings of current system TRC's and five bar TRC's can be stored in the image forming apparatus prior to operation. However, storing all of these permutations requires a significant amount of storage space, which increases the cost of the image forming apparatus.

It is therefore desirable to enable the image forming apparatus to determine a new system TRC, based upon the current manually adjustable five bar TRC, in real time, which would reduce the amount of storage space required. The invention is intended to cover all methods and apparatus capable of performing the real time determinations.

For example, the current system TRC being used for the mode of processing can be cascaded with manually changeable five bar settings. The system TRC for the selected mode of processing and the five bar settings can be combined by various methods, such as by using basic look-up tables (LUT) and linear interpolation methods to create a new adjusted system TRC.

The new adjusted TRC can then be used by an image processing sub-system of the image forming apparatus to adjust the input image to produce the desired output. Such an operation can provide for finer tuning of the system TRC than what would be provided by merely providing the user with contrast and brightness adjustments, which enables the user to achieve enhanced flexibility in determining how to adjust an output image.

Thus, a method of controlling an image forming apparatus in accordance with the invention can include the steps of: providing a system tone reproduction curve; representing a manually adjustable tone reproduction curve; modifying the manually adjustable tone reproduction curve to be consistent with the system tone reproduction curve; and cascading the manually adjustable tone reproduction curve with the system tone reproduction curve to provide a new adjusted tone reproduction curve.

Further, an image forming apparatus in accordance with the invention can include: a medium that stores a system tone reproduction curve; a graphical user interface that represents a manually adjustable tone reproduction curve; and a determining device that cascades the manually adjustable tone reproduction curve with the system tone reproduction curve to provide a new adjusted tone reproduction curve.

These and other features and advantages of this invention are described in or are apparent from the following detailed description of various exemplary embodiments of the systems and methods according to this invention.

BRIEF DESCRIPTION OF THE DRAWINGS

Various exemplary embodiments of systems and methods according to this invention will be described in detail, with reference to the following figures, wherein.

DETAILED DESCRIPTION OF PREFERRED EMBODIMENTS

The invention is intended to cover all apparatus and methods of determining a new system TRC, based upon current settings of a manually adjustable five bar TRC, in real time. The following description provides details of just one of many methods that can be used to accomplish these real time determinations.

Prior to operation, a system TRC data file can be read into a module of an image forming apparatus. The system TRC data file can contain information to provide for the compensation of differences in brightness and contrast between input image information and an output image which would be caused by characteristics of input and output devices of the image forming apparatus.

The data file can contain a finite set of points representing the desired input and output relationship for the system. For the current system, this relationship can be represented as L*in versus L*out, which can represent a unit space based on visual perception.

Figure 1:
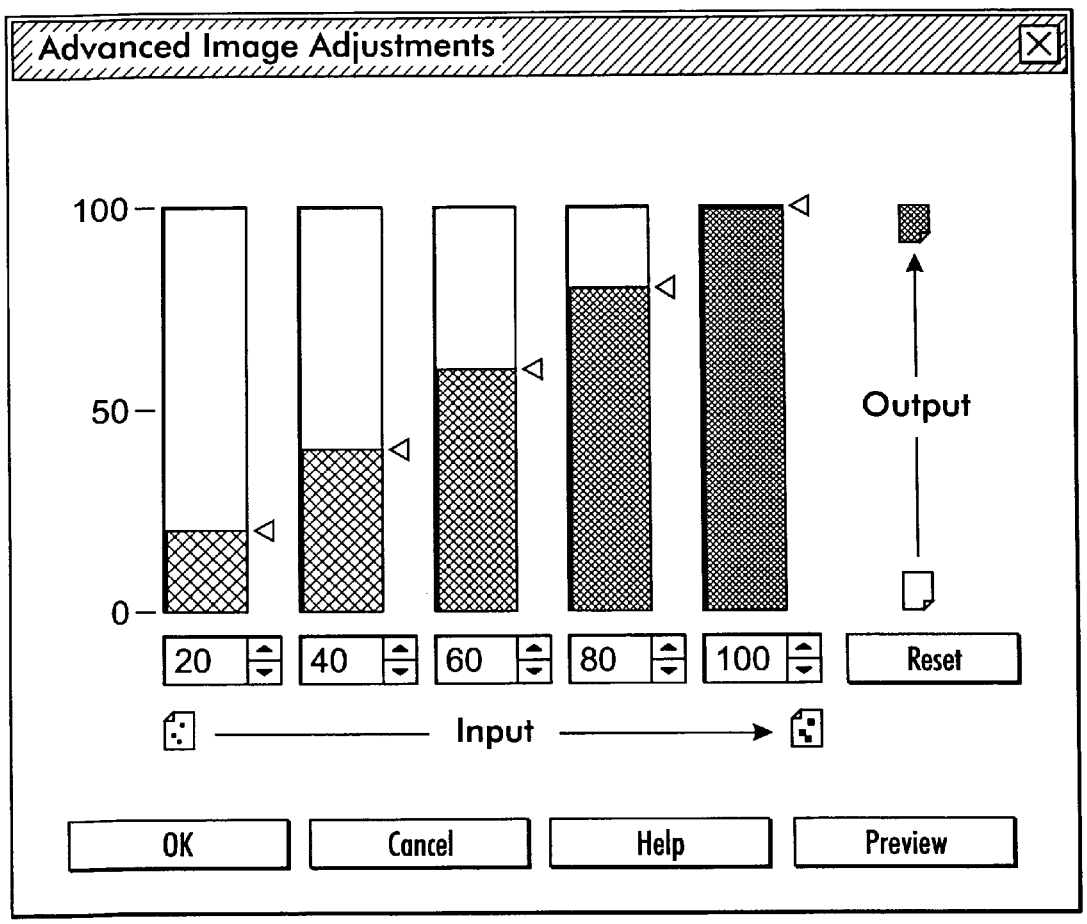
FIG. 1 shows user settings of a five bar TRC graphical user interface (GUI)

The manually adjustable five bar TRC can be represented to a user via a graphical user interface (GUI). For example, FIG. 1 shows user settings of a five bar TRC GUI. The settings of the five bar TRC GUI can be used to create an adjustment curve which modifies the original system TRC in accordance with the user's desired output response.

The scale of the GUI shown in FIG. 1 is relative, and functions inversely to L*. The relative scale may be desirable to keep the five bar adjustment consistent with implementations in current image forming apparatus. However, the invention is intended to cover any possible representation which enables the user to adjust the TRC.

The five bar TRC settings need to be consistent with the system TRC so that the five bar TRC can adjust the system TRC. The five bar TRC settings can be converted to L* to provide this consistency. The invention is intended to cover any method for accomplishing this consistency.

For example, the five bar TRC can be created in L* space by first fixing seven input values, such as, for example, 0, 10, 30, 50, 70, 90 and 100 L*. The five bar settings from the GUI can then be passed to a module of the image forming apparatus which converts them to L* by subtracting each value from 100, and then pairing it with one of the fixed input values starting from the 90 L* input and ending with the 10 L* input (converting the input scale to L*.) The 0 and 100 L* inputs are set to the same output values that were set for the 10 and 90 L* inputs, respectively. For example, in the case shown in FIG. 1, the 0 and 10 L*in values would be paired with 100 minus 100, or 0 L*. The 30 L* would be paired with 100 minus 80 or 20 L*, and the rest would follow this same procedure.

Figures 2, 3:
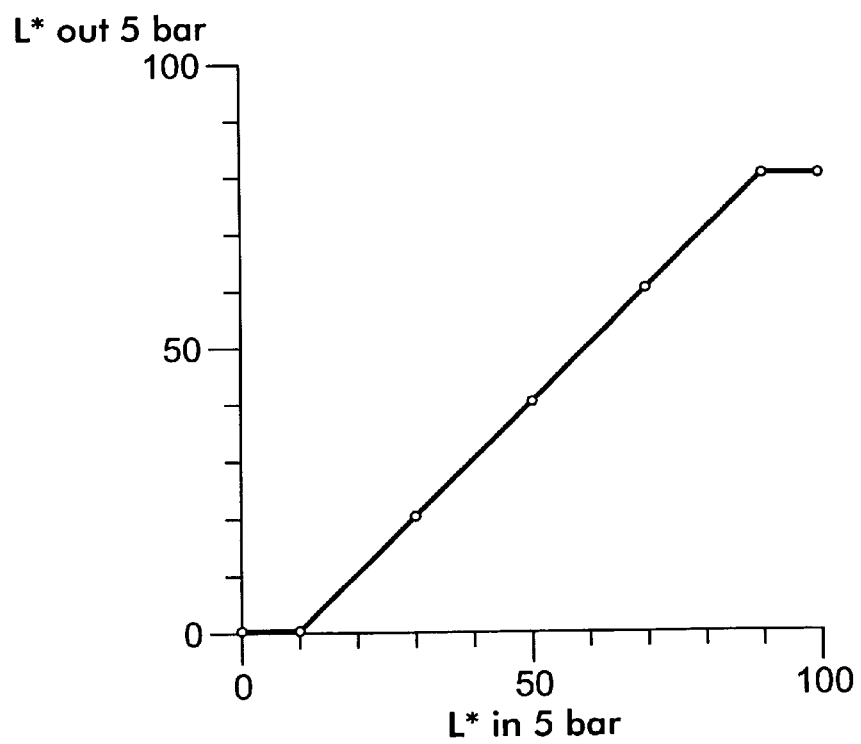
FIG. 2 is an adjustment curve look-up table (LUT) corresponding to the five bar settings shown in the five bar TRC GUI of FIG. 1, which is provided by converting the values shown in FIG. 1 into L* space.
FIG. 3 is an adjustment curve that is provided by the data of the LUT of FIG. 3.

FIG. 2 is an adjustment curve look-up table (LUT), corresponding to the five user settings shown in the five bar TRC GUI of FIG. 1, which is provided by the conversion of the values shown in FIG. 1 into L* space as discussed above. FIG. 3 is an adjustment curve that is provided by the data of the LUT of FIG. 2, wherein L*in defines the X axis, and L*out defines the Y axis of the cartesian plane.

Figures 4, 5:
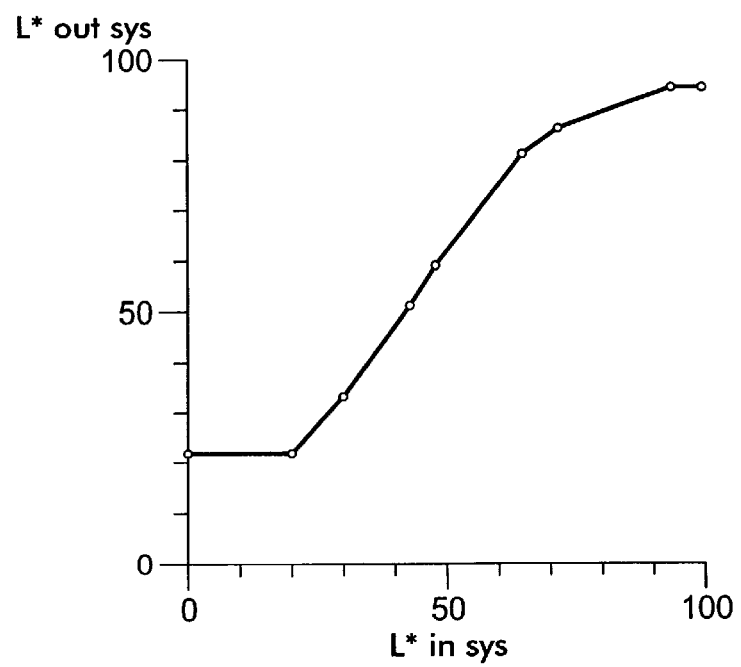
FIG. 4 is a LUT that includes data points of an exemplary original system TRC.
FIG. 5 is an exemplary system curve that is provided by the exemplary data of the LUT of FIG. 4.

FIG. 4 is a look-up table (LUT) that includes data points of an exemplary original system TRC provided by the system TRC data file that is read into the module prior to operation. As discussed above, the original system TRC provides general compensation for differences in brightness and contrast between input information and the output image which are caused by the characteristics of the input and output devices. FIG. 5 is an exemplary system curve that is provided by the exemplary data of the LUT of FIG. 4, wherein L*in$_{sys}$ defines the X axis, and L*out$_{sys}$ defines the Y axis of the cartesian plane.

Figures 6, 7:
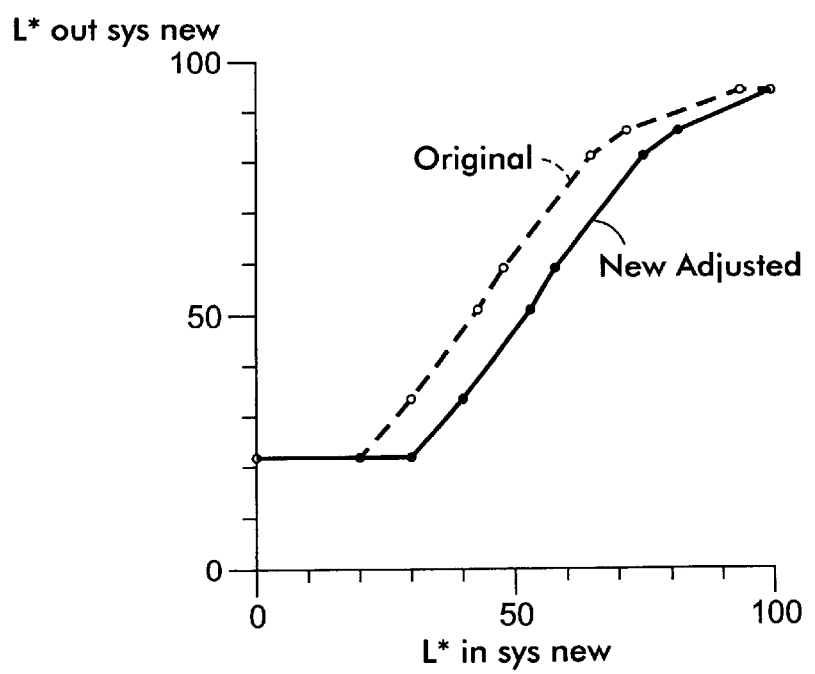
FIG. 6 is a LUT that includes data points of a resultant new adjusted system TRC.
FIG. 7 is a new adjusted system curve that is provided by the data of FIG. 6.

The five bar adjustment curve of FIG. 3 is cascaded with the exemplary original system curve of FIG. 5, which results in adjusting the original system curve by the five bar curve. FIG. 6 is a look-up table (LUT) that includes data points of the resultant new adjusted system TRC. FIG. 7 is the new adjusted system curve that is provided by the data of the LUT of FIG. 6, wherein L*in$_{sys\ new}$ defines the X axis, and L*out$_{sys\ new}$ defines the Y axis of the cartesian plane.

The values and number of data points listed in FIGS. 2, 4 and 6 and graphically depicted in FIGS. 3, 5 and 7 are merely provided for exemplary purposes. In fact, the invention is intended to cover any number of data points having any value. The invention is also intended to cover any method of cascading the five bar adjustment curve with the original system curve. However, one exemplary method of performing this cascading operation is described in detail below.

For example, cascading can be performed by comparing each system L*in (L*in$_{sys}$) value, shown in the LUT of FIG. 4, to the closest five bar L*out (L*out$_{5bar}$) value, shown in the LUT of FIG. 2. If L*in$_{sys}$ equals an L*out$_{5bar}$, then a new adjusted system point (L*in$_{sys\ new}$, L*out$_{sys\ new}$) is set to the corresponding five bar L*in (L*in$_{5bar}$) and the original system L*out (L*out$_{sys}$). The new adjusted system point (L*in$_{sys\ new}$, L*out$_{sys\ new}$) is provided in the LUT of FIG. 6.

For example, an L*in$_{sys}$ of 20 can be selected from FIG. 4. As shown in the LUT of FIG. 2, the closest L*out$_{5bar}$ to this value also equals 20. Therefore, the corresponding L*in$_{5bar}$ value of 30 is used in conjunction with the L*out$_{sys}$ of 22 to form the new adjusted system point of (30, 22), which is shown in the LUT of FIG. 6.

However, cascading is performed differently if the selected L*in$_{sys}$ of FIG. 4 is not equal to L*out$_{5bar}$ of FIG. 2. In such a situation, a new interpolated L*in$_{sys\ new}$ can be determined by using Equation 1, which is provided below:

$$L^* in_{sys\ new} = \qquad (1)$$

$$L^* in_{barL} + \left( \frac{(L^* in_{5barH} - L^* in_{5barL}) \times (L^* in_{sys} - L^* out_{5barL})}{(L^* out_{5barH} - L^* out_{5barL})} \right)$$

where:

$L^* in_{sys\ new}$ The new interpolated system L*in.

$L^* in_{sys}$ The original system L*in value.

$L^* in_{5barL}$ and $L^* in_{5barH}$ The lower and higher L*in values on the five bar adjustment curve, respectively.

$L^* out_{5barL}$ and $L^* out_{5barH}$ The lower and higher L*out values on the five bar adjustment curve, respectively.

The new interpolated system L*in ($L^* in_{sys\ new}$) value can be paired with the original system L*out ($L^* out_{sys}$) value. The result of this pairing provides a new adjusted system TRC data point ($L^* in_{sys\ new}$, $L^* out_{sys\ new}$), as shown in FIG. 6. The above cascading operations enable the image forming apparatus to determine a new system TRC, based upon manually adjustable TRC settings, in real time, which enables a user to achieve enhanced flexibility in determining how to adjust an output image, while also reducing the amount of storage space required to provide this flexibility.

For example, an $L^* in_{sys}$ of 30 can be selected from FIG. 4. As shown in FIG. 2, no $L^* out_{5bar}$ value equals 30. Instead, the value of 30 is between the $L^* out_{5bar}$ values of 20 and 40.

In this example, the following values can then be input to equation 1:

$L^* in_{sys}$=30

$L^* in_{5barL}$=30

$L^* in_{5barH}$=50

$L^* out_{5barL}$=20

$L^* out_{5barH}$=40.

Equation 1 can thereby be represented as follows:

$$L^* in_{sys\ new} = 30 + \left( \frac{(50-30) \times (30-20)}{(40-20)} \right)$$

$L^* in_{sys\ new}$=40.

The determined $L^* in_{sys\ new}$ value of 40 can be used in conjunction with the $L^* out_{sys}$ of 33. This forms the new adjusted system point of (40,33), as shown in FIG. 6.

The above cascading operation can be performed for all data points of the image. The resulting data points from the cascading operation can be combined to form a complete new adjusted system TRC, based on the five bar settings, which can be used by the rest of the image processing sub-system of the image forming apparatus.

Figure 8:
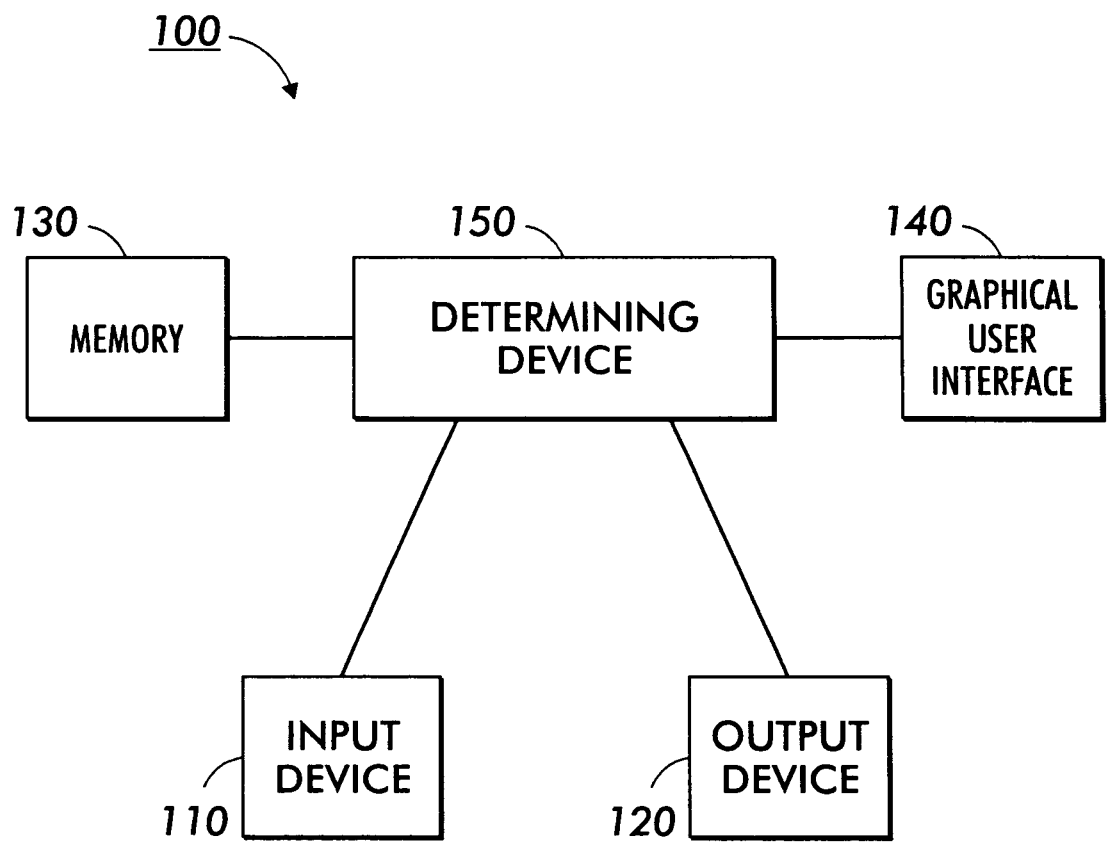
FIG. 8 is a block diagram of an image forming apparatus in accordance with the invention.

FIG. 8 is a block diagram of an image forming apparatus 100 in accordance with the invention discussed above. As shown in FIG. 8, image information is input to an input device 110. The input device 110 can be, for example, a scanner that scans an image. An output device 120 forms an image based on the input image information. The output device 120 can be, for example, a printer that prints an image on a sheet, or a monitor that displays an image on a screen.

An original system TRC is input and stored in a memory 130. A graphical user interface 140 represents a manually adjustable TRC. The original system TRC and manually adjustable TRC are input to a determining device 150, which cascades the manually adjustable TRC with the original system TRC to provide a new adjusted TRC.

Figure 9:
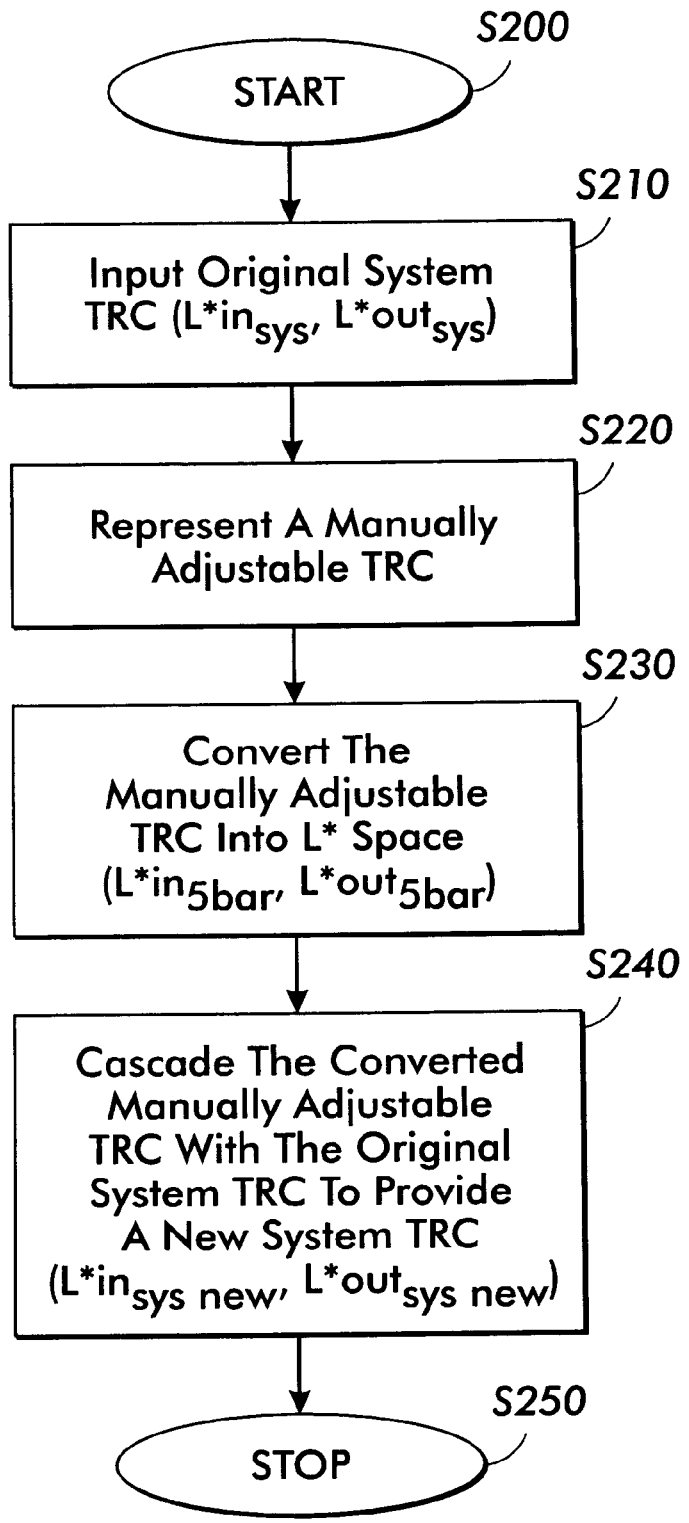
FIG. 9 is a flowchart of a method of controlling an image forming apparatus in accordance with the invention.

FIG. 9 is a flowchart of a method of controlling an image forming apparatus in accordance with the invention. Beginning in S200, control continues to S210, where an original system TRC ($L^* in_{sys}$, $L^* out_{sys}$) is input. A manually adjustable TRC ($L^* in_{5bar}$, $L^* out_{5bar}$) is represented to a user, such as via a graphical user interface, in S220. The manually adjustable TRC is converted to L* space ($L^* in_{5bar}$, $L^* out_{5bar}$) in S230. The converted manually adjustable TRC is cascaded with the original system TRC in S240 to provide a new adjusted TRC ($L^* in_{sys\ new}$, $L^* out_{sys\ new}$), and control ends at S250.

Figure 10:
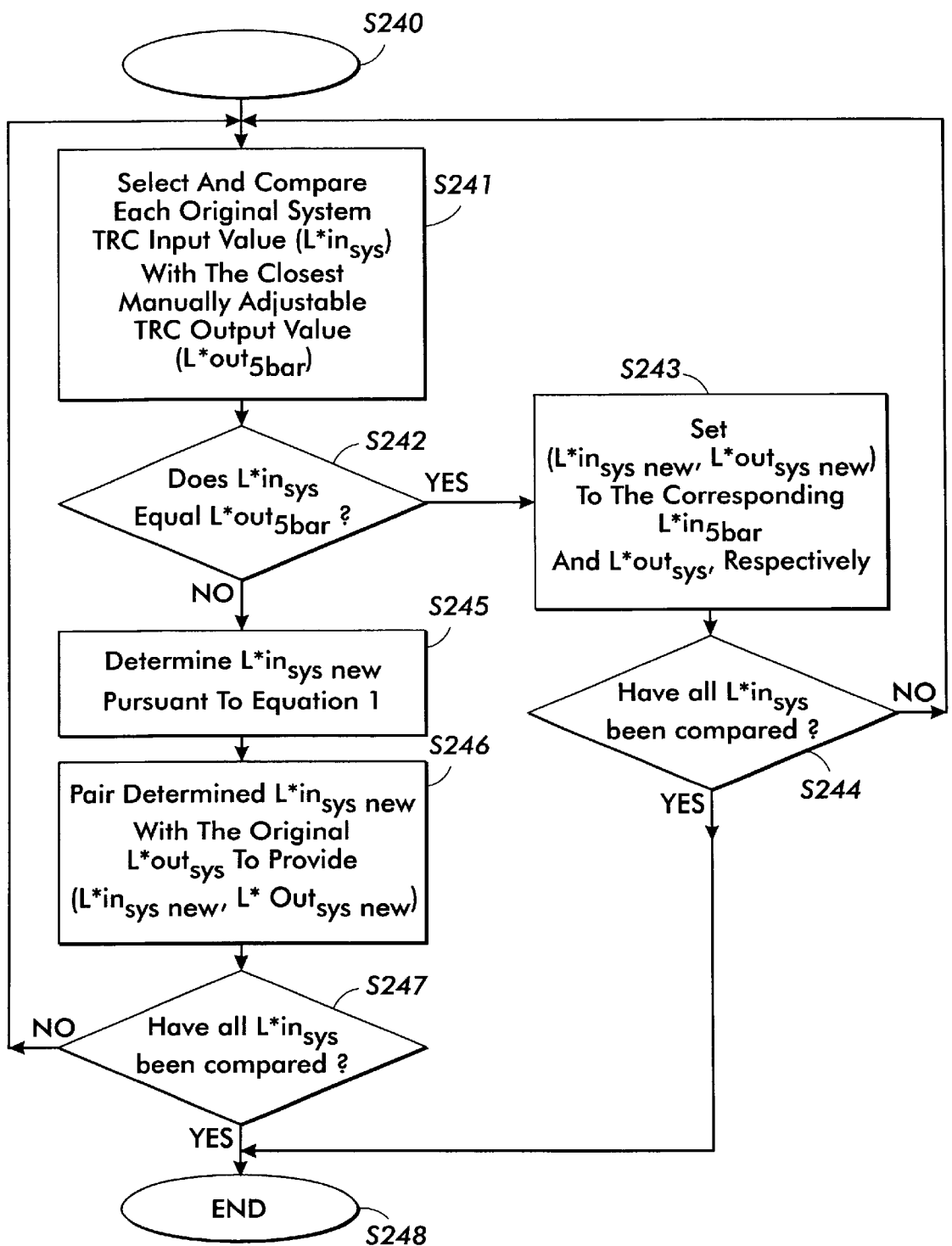
FIG. 10 is a flowchart outlining in greater detail the cascading S240 of FIG. 9.

FIG. 10 is a flowchart outlining in greater detail the cascading S240 of FIG. 9. Beginning in S241, each original system TRC input value $L^* in_{sys}$ is selected and compared with the closest manually adjustable TRC output value $L^* out_{5bar}$. In S242, it is determined whether $L^* in_{sys}$ equals an $L^* out_{5bar}$.

If the result of this determination is affirmative, then control continues to S243 where $L^* in_{sys\ new}$, $L^* out_{sys\ new}$ is set to the corresponding $L^* in_{5bar}$ and $L^* out_{sys}$, respectively. In S244, it is determined whether all $L^* in_{sys}$ have been selected and compared. If not, then control returns to S241. If so, then control continues to S248 where the control sequence ends.

If the result of the determination in S242 is negative, then control continues to S245 where $L^* in_{sys\ new}$ is determined pursuant to equation 1. In S246, the determined $L^* in_{sys\ new}$ is paired with the original $L^* out_{sys}$ to provide $L^* in_{sys\ new}$, $L^* out_{sys\ new}$. In S247, it is determined whether all $L^* in_{sys}$ have been selected and compared. If not, then control returns to S241. If so, then control continues to S248 where the control sequence ends.

The operations and determinations discussed above can be implemented using a programmed general purpose computer. However, the various operations and determinations described above can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device capable of implementing a finite state machine that is in turn capable of implementing the operations and determinations discussed above can be used to implement these operations and determinations.

Communication links used in the implementation of this invention can be any known or later developed device, including a direct cable connection, a connection over a wide area network or a local area network, a connection over an intranet, a connection over the Internet, or a connection over any other distributed processing network or system. In general, the communication links can be any known or later developed connection system or structure usable to connect systems or devices used to implement the invention.

While the systems and methods of this invention have been described in conjunction with the specific embodiments outlined above, it is evident that many alternatives, modifications and variations will be apparent to those skilled in the art. Accordingly, the exemplary embodiments of the systems and methods of this invention, as set forth above, are intended to be illustrative, not limiting. Various changes may be made without departing from the spirit and scope of the invention.

What is claimed is:

1. A method of controlling an image forming apparatus, comprising the steps of:

providing a system tone reproduction curve, said providing including reading a system tone reproduction curve file into a module of the image forming apparatus prior to operation of the image forming apparatus;

representing a manually adjustable tone reproduction curve;

modifying the manually adjustable tone reproduction curve to be consistent with the system tone reproduction curve; and cascading the manually adjustable tone reproduction curve with the system tone reproduction curve to provide a new adjusted tone reproduction curve.

2. The method according to claim 1, wherein the step of providing a system tone reproduction curve includes providing a system tone reproduction curve that compensates for differences in brightness and contrast between image information input to the image forming apparatus and an output image provided by the image forming apparatus.

3. The method according to claim 1, wherein the representing step includes representing a five bar manually adjustable tone reproduction curve via a graphical user interface.

4. The method according to claim 3, wherein the representing step includes representing a five bar manually adjustable tone reproduction curve via a relative scale.

5. The method according to claim 3, wherein the providing step includes providing a system tone reproduction curve that is represented as $L^*in_{sys}$ versus $L^*out_{sys}$, wherein $L^*$ constitutes a unit space based on visual perception.

6. The method according to claim 5, wherein the modifying step includes converting the five bar manually adjustable tone reproduction curve to be represented in $L^*$ space to be consistent with the representation of the system tone reproduction curve.

7. The method according to claim 6, modifying step includes fixing seven input values.

8. The method according to claim 7, wherein the modifying step includes fixing seven input values that include 0, 10, 30, 50, 70, 90 and 100 $L^*$.

9. The method according to claim 8, wherein the modifying step includes subtracting the seven fixed input values by 100, and then pairing the resultant with one of the seven fixed input values starting from the 90 $L^*$ input and ending with the 10 $L^*$ input.

10. The method according to claim 9, wherein the modifying step includes setting the 0 and 100 $L^*$ inputs to the same output values that were set for the 10 and 90 $L^*$ inputs, respectively.

11. The method according to claim 1, wherein the cascading step includes comparing each system tone reproduction curve input value ($L^*in_{sys}$) to the closest five bar manually adjustable tone reproduction curve output value ($L^*out_{5bar}$), and if $L^*in_{sys}$ equals an $L^*out_{5bar}$, then setting a new adjusted system point ($L^*in_{sys\ new}$, $L^*out_{sys\ new}$) to the corresponding five bar manually adjustable tone reproduction curve input value ($L^*in_{5bar}$) and the system tone reproduction curve output value ($L^*out_{sys}$).

12. The method according to claim 11, wherein the cascading step includes comparing each $L^*in_{sys}$ to the closest $L^*out_{5bar}$, and if $L^*in_{sys}$ does not equal an $L^*out_{5bar}$, then determining a $L^*in_{sys\ new}$ pursuant to the following equation:

$$L^*in_{sys\ new} = L^*in_{5barL} + \left( \frac{(L^*in_{5barH} - L^*in_{5barL}) \times (in_{sys} - L^*out_{5barL})}{L^*out_{5barH} - L^*out_{5barL}} \right)$$

where:

$L^*in_{sys\ new}$ The new interpolated system $L^*in$, $L^*in_{sys}$ The original system $L^*$ in value, $L^*in_{5barL}$ and $L^*in_{5barH}$ The lower and higher $L^*$ in values on the five bar adjustment curve, respectively, $L^*out_{5barL}$ and $L^*out_{5barH}$ The lower and higher $L^*$ out values on the five bar adjustment curve, respectively;

and pairing $L^*in_{sys\ new}$ with the original $L^*out_{sys}$, so as to provide $L^*in_{sys\ new}$, $L^*out_{sys\ new}$.

13. An image forming apparatus, comprising:

a medium that stores a system tone reproduction curve;

a graphical user interface that represents a five bar manually adjustable tone reproduction curve; and a determining device that cascades the manually adjustable tone reproduction curve with the system tone reproduction curve to provide a new adjusted tone reproduction curve.

14. The image forming apparatus according to claim 1, wherein the medium stores the system tone reproduction curve that is represented as $L^*in_{sys}$ versus $L^*out_{sys}$, wherein $L^*$ constitutes a unit space based on visual perception.

15. The image forming apparatus according to claim 14, further including a converting device that converts the five bar manually adjustable tone reproduction curve to be represented in $L^*$ space to be consistent with the representation of the system tone reproduction curve.

16. The image forming apparatus according to claim 15, wherein the determining device compares each system tone reproduction curve input value ($L^*in_{sys}$) to the closest five bar manually adjustable tone reproduction curve output value ($L^*out_{5bar}$), and if $L^*in_{sys}$ equals an $L^*out_{5bar}$, then the determining device sets a new adjusted system point ($L^*in_{sys\ new}$, $L^*out_{sys\ new}$) to the corresponding five bar manually adjustable tone reproduction curve input value ($L^*in_{5bar}$) and the system tone reproduction curve output value ($L^*out_{sys}$).

17. The image forming apparatus according to claim 16, wherein the determining device compares each $L^*in_{sys}$ to the closest $L^*out_{5bar}$, and if $L^*in_{sys}$ does not equal an $L^*out_{5bar}$, then the determining device determines a $L^*in_{sys\ new}$ pursuant to the following equation:

$$L^*in_{sys\ new} = L^*in_{5barL} + \left( \frac{(L^*in_{5barH} - L^*in_{5barL}) \times (in_{sys} - L^*out_{5barL})}{(L^*out_{5barH} - L^*out_{5barL})} \right)$$

where:

$L^*in_{sys\ new}$ The new interpolated system $L^*in$, $L^*in_{sys}$ The original system $L^*in$ value, $L^*in_{5barL}$ and $L^*in_{5barH}$ The lower and higher $L^*in$ values on the five bar adjustment curve, respectively;

$L^*out_{5barL}$ and $L^*out_{5barH}$ The lower and higher $L^*out$ values on the five bar adjustment curve, respectively;

and pairs $L^*in_{sys\ new}$ with the original $L^*out_{sys}$, so as to provide $L^*in_{sys\ new}$, $L^*out_{sys\ new}$.

* * * * *